No. 609,922. Patented Aug. 30, 1898.
G. W. TUBBS.
CUSHION TIRE FOR BICYCLES.
(Application filed Feb. 24, 1898.)
(No Model.)
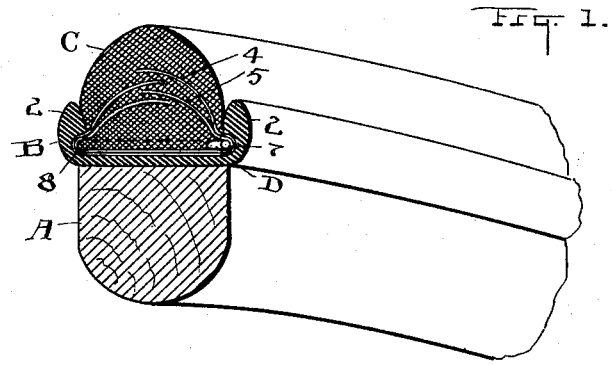
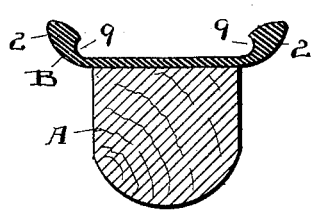
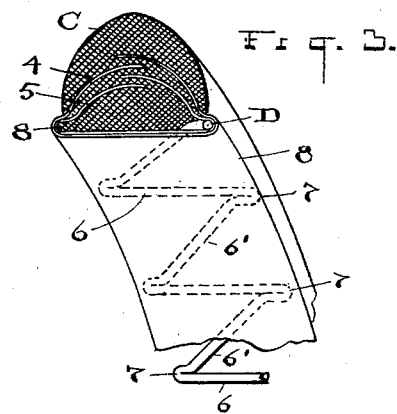
ATTEST
Richard B. Moser
H. M. Sharp
INVENTOR.
George W. Tubbs.
By H. F. Fisher ATTY

UNITED STATES PATENT OFFICE.

GEORGE W. TUBBS, OF CLEVELAND, OHIO, ASSIGNOR OF ONE-HALF TO C. E. COTTON, OF SAME PLACE.

CUSHION-TIRE FOR BICYCLES.

SPECIFICATION forming part of Letters Patent No. 609,922, dated August 30, 1898.

Application filed February 24, 1898. Serial No. 671,434. (No model.)

*To all whom it may concern:*

Be it known that I, GEORGE W. TUBBS, a citizen of the United States, residing at Cleveland, in the county of Cuyahoga and State of Ohio, have invented certain new and useful Improvements in Cushioned Tires for Bicycle or other Wheels; and I do declare that the following is a full, clear, and exact description of the invention, which will enable others skilled in the art to which it appertains to make and use the same.

My invention relates to cushioned tires for bicycle and other wheels; and the object of the invention is to provide a tire which affords all the advantages of comfort and ease that are found in the pneumatic tire or other perfectly-cushioned tires, but is not liable to the serious objection of puncturing or the like, as in pneumatic tires.

To these several ends the invention consists in the construction and combination of parts, substantially as shown and described, and particularly pointed out in the claims.

In the accompanying drawings, Figure 1 is a perspective elevation of a portion of my improved tire, showing the same in cross-section as it appears made up and ready for use. Fig. 2 is a cross-section of the rim and metallic encircling plate fixed upon the rim and ready to receive the cushioning mechanism. Fig. 3 is a perspective view of a section of the elastic or rubber portion of the tire and its attached and incorporated parts, as hereinafter more fully described.

In the accompanying drawings, A represents the usual felly, corresponding to the wooden rim of the pneumatic tire, but in this instance fashioned with a flat exterior.

B is a channel-steel band forming a tire-holder, which is laid around or upon the rim A very much as a tire is placed upon an ordinary vehicle-wheel and is formed with flanges 2 along its edges, adapted to be bent up into engaging position, as seen in Fig. 1 and as hereinafter more fully described.

C represents the tire proper and consists of a strip of india-rubber of suitable quality and consistency and adapted to rest in and upon the band B and to be held thereby and take the tread of the wheel. This is the yielding or cushioning member of the wheel, and hence the density or firmness of the said strip or piece will be governed by the function it is to serve and the place it is to occupy in the structure. In any event the said strip will require to be comparatively close and firm in its make-up, but which will yet leave spring enough to serve the purpose and give the effect practically of a pneumatic tire. Now in order that the said spring tire or member may be adapted to use as shown it is necessary that some suitable means be provided to secure it upon the wheel. To this end I produce the said tire with a web D of wire, which is vulcanized into its base along with the fabric or heavy cloth or canvas sheets 4 and 5, one or more imbedded in the body of the said tire, preferably up toward its center, to strengthen the tire, as well as firmly secure wire webbing D.

The web D is bent to form straight cross-braces 6 and diagonal transverse braces 6', terminating together in rounded shoulders or short bends 7 at intervals on both sides and standing out beyond the outer surface of the body of the tire sufficiently to produce an engaging portion for holding the tire in place. Intermediate of the said projections 7, at each side, there is a rib or bead of rubber 8, corresponding in depth to the lateral projection of the wire bends 7 and serving to help hold the tire in position, and the canvas or fabric 4 and 5, which is stretched along over the said projections, being incorporated in and with said beads, gives them additional strength.

Referring now to the flanges or wings 2 of the channel-steel band B, it will be noticed that a groove or channel 9 is provided in the angle of said flanges with the flat bottom of said band B corresponding in size and depth substantially to the ribs or beads 8, and hence after the tire is placed in position on the band and the flanges 2 are bent upward into permanent position the said beads or ribs 8 are closely confined in said channel and the tire is firmly secured in place. The flanges 2 extend some distance above the groove in the base thereof to give lateral support to the tire, and when the canvas strips 4 and 5 reach above this point into the body of the tire C, as shown, there is such cross-sectional strength given to the tire that by no accident or abuse of riding can the tire be sheared or broken off just above the flanges, which is its weakest spot and might otherwise be a fatal weakness. With the canvas as shown all such danger is prevented and the tire is made proof against injury in this way.

The several parts are put together in the order substantially as hereinbefore described, and the wire projections 7 hold so firmly in the said grooves that the tire cannot by any possibility be dislodged or withdrawn by use. To remove the tire, the flanges 2, one or both, may be bent outward sufficiently for that purpose. The tire itself is made up as an article of manufacture and sale. Any equivalent shape given to the wire D may be adopted, the idea being to have projections on both sides in the bead to lock the tire in place.

What I claim as new is—

1. In vehicle-wheels, a wooden rim having a flat exterior, a flat band of flexible metal around said rim having flanges along its edges and channels on the inside at the base of said flanges, said flanges being deepest in cross-section next above said channels, in combination with a solid-rubber tire having a bead along each inner edge engaged in said channels, and a fabric-covered wire embedded in the base of said tire and having projecting portions at intervals extending into said beads, substantially as described.

2. The wheel described having a wooden rim and a flat band around the same having flanges along its edges and channels in the angles of the flanges and the said band, in combination with a solid-rubber tire having reinforced beads engaged in said channels and fabric projecting into the center of the tire from the said beads, substantially as described.

Witness my hand to the foregoing specification this 12th day of February, 1898.

GEORGE W. TUBBS.

Witnesses:
H. T. FISHER,
R. B. MOSER.